MODULATION-ON-PULSE CONTROL SYSTEM

Filed March 26, 1945 3 Sheets-Sheet 1

Inventors
ERNST H. KRAUSE
CONRAD H. HOEPPNER

By Ralph L. Chappell
Attorney

Inventors
ERNST H. KRAUSE
CONRAD H. HOEPPNER
By Ralph L. Chappell
Attorney

Inventors
ERNST H. KRAUSE
CONRAD H. HOEPPNER

By Ralph L. Chappell
Attorney

Patented Jan. 16, 1951

2,538,017

UNITED STATES PATENT OFFICE 2,538,017

MODULATION-ON-PULSE CONTROL SYSTEM

Ernst H. Krause, Cheverly, Md., and Conrad H. Hoeppner, Washington, D. C.

Application March 26, 1945, Serial No. 584,997

2 Claims. (Cl. 250—6)

(Granted under the act of March 3, 1883, as amended April 30, 1928; 370 O. G. 757)

This invention relates in general to a pulse type of communication system and in particular to a radio pulse type of communication system wherein each pulse signal is emitted in the form of a sinuously modulated burst of electromagnetic energy.

It is an object of this invention to provide a pulse type communication system whereby the effects of interference caused by either man-made or natural sources are substantially eliminated.

Another object of this invention is to provide a pulse type receiver system which is held singly responsive to a sinuously modulated pulse signal of the type hereinafter described.

Another object of this invention is to provide a pulse type communication system wherein pulse distortion caused by reflections from nearby objects is of a minimum consequence.

Another object of this invention is to provide a pulse type communication system whereby selective transmission to any one of several remote receivers is made possible.

Other objects and features of the present invention will become apparent upon a careful consideration of the following detailed description when taken together with the accompanying drawings.

Briefly, it is contemplated by this invention to provide a means whereby the pulse signals of an ordinary repetitive, non-repetitive or other suitable type of pulse signalling system are given a definite transmission characteristic, namely, one in which each of the pulse signals to be transmitted is transformed into a sinuously modulated burst of electromagnetic energy. In this way, a special receiver held singly responsive to the transmission characteristics of the system may be provided. The susceptibility of this receiver to interference caused by either man-made or natural sources, including reflection, is thereby reduced to a minimum.

Figure 1:
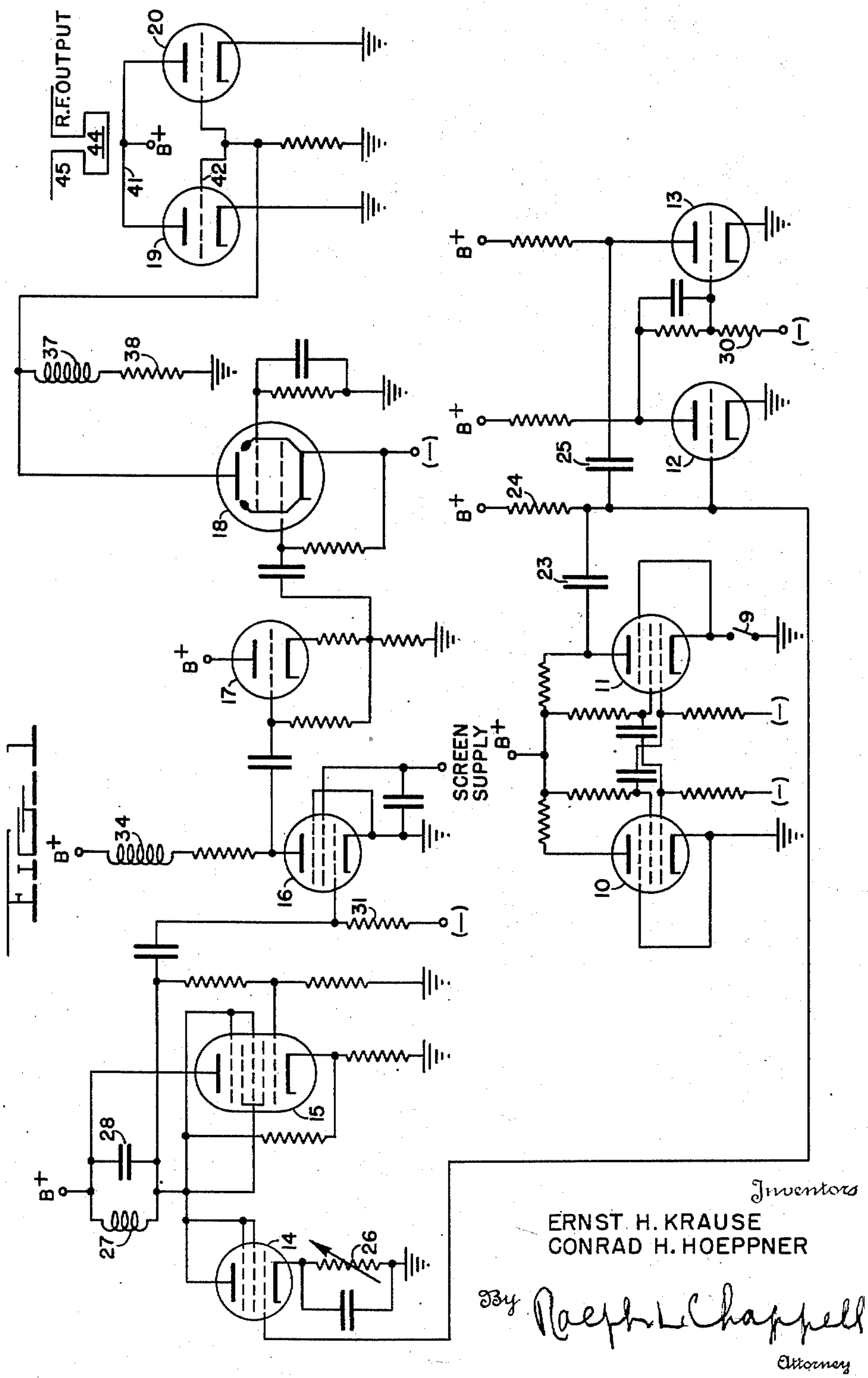
Fig. 1 is a detailed circuit diagram of the transmitter system of the invention.

For purposes of illustration the transmitter system as shown in Fig. 1 is connected to a repetitive type of pulse system. The latter consists of a timer, including tubes 10 and 11, and a pulse generator, including tubes 12 and 13. The timer is connected as an electron-coupled type of "free running" multivibrator whose function is to generate a timing wave by which the operation of the pulse generator is controlled. To start and stop the timer a key type switch 9, for example, is disposed in the cathode circuit of tube 11. When switch 9 is closed, the plate voltage of tube 11 immediately drops and thereby sets the timer into operation, generating at the plate of tube 11 a rectangular voltage wave somewhat as shown by wave form *a* of Fig. 3. This voltage wave represents the output of the timer and serves as a synchronizing voltage for controlling the operation of the pulse generator. To perform the latter, the output from the plate of tube 11 in the timer circuit is applied through a low time constant circuit, comprising capacitance 23 and resistance 24 to the control grid of tube 12, of the pulse generator. Since capacitance 23 and resistance 24 form a low time constant circuit, each time the plate of tube 11 drops negative an abrupt negative voltage pulse is applied to the grid of tube 12, and each time the plate of tube 11 rises positive an abrupt positive pulse is applied to the grid of tube 12. As here shown, the pulse generator is connected as a "one shot" type of multivibrator, having the grid of tube 12 returned through resistance 24 to a source of B+ and the grid of tube 13 returned through resistance 30 to a source of C—. With this arrangement the multivibrator will support one stable condition, namely, when tube 12 is conducting and tube 13 non-conducting, and in which condition the tubes will remain until a negative pulse is applied to the control grid of tube 12. At this instant tube 12 is rendered non-conducting and tube 13 conducting. Thereafter capacitors 23 and 25 start a gradual charge through the resistance 24 to raise the grid of tube 12 to cut-off. At the instant the grid of tube 12 reaches cut-off, tubes 12 and 13 return to their former state of conduction and non-conduction, respectively. This action generates at the grid of tube 12 the negative voltage pulse shown in wave form *b* of Fig. 3.

This pulse represents the output from the repetitive pulse system and is consequently representative of the pulse it is desired to transmit. In accordance with the invention, this pulse is used to control the production of a train of sine wave oscillations, starting the oscillations at the leading edge of the pulse and stopping them at the trailing edge of the pulse. These oscillations are in turn used to control the operation of a power oscillator, producing thereby a sinuously modulated pulse of electromagnetic energy.

For the above reason there is provided in the transmitter system of Fig. 1 a sine wave oscillator 15, an oscillator keyer 14, a shaping and amplifying tube 16, a cathode follower 17, a hard tube modulator 18 and a power oscillator comprising tubes 19 and 20. The oscillator 15, although it may be of any conventional design, is preferably of the negative transconductance or "transitron" variety with its tank circuit comprising inductance 27 and capacitance 28 disposed in the plate circuit of the keying tube 14. The keying tube 14 may be a triode or other suitable type with its control grid returned to the control grid of tube 12 in the pulse generator. In the quiescent condition, that is before switch 9 is closed, tube 14 is held in a conducting state, drawing a heavy current through the oscillator tank inductance to hold the oscillator 15 quiescent. During operation, however, when the grid of tube 12 is driven negative as shown in wave form *b* the keying tube 14 is driven beyond cut-off, designated as the dotted line labelled C. O. thereby abruptly stopping the plate current drain through the oscillator inductance 27. Whereupon the oscillator 15 is immediately forced into oscillation as shown by the wave form *c* of Fig. 3. These oscillations are sustained as long as tube 14 is held non-conducting. When tube 14 is returned to conduction, at the end of the non-conducting period of tube 12, its plate current quickly "damps out" further oscillation to reduce the transients which normally occur at the stopping of oscillations. To reduce transients to a minimum at the start of oscillations the resistance 26, which forms, in part, a self-biasing circuit for tube 14, may be adjusted so that the quiescent plate current of tube 14 will cause the first cycle of oscillation to be equal in amplitude and in duration to those that follow it.

It naturally follows that the number of cycles generated by the oscillator 15 during the blocked period of tube 12 and consequently the number of cycles of modulation on the transmitted pulse is a function of both the non-conducting period of tube 12 and the frequency of oscillator 15. One arrangement which has been found very satisfactory has employed a frequency of 500 kilocycles per second for the oscillator 15 and a 50 microsecond non-conducting period for tube 12. Under these conditions 150 megacycles would be representative of a suitable carrier frequency.

The output from the oscillator 15 is taken from the plate of tube 14 and applied through a straight R.-C. coupling circuit to the control grid of the shaping tube 16. This tube is normally cut off by a high negative bias applied to its grid through resistance 31 but becomes conducting during the positive half cycles of the oscillation. The flow of plate current in this tube, is thus in a series of clipped or half sine waves. To shape these current pulses, an inductance 34 is inserted in the plate circuit of tube 16, which in combination with the distributed capacitance of that stage functions as a low pass filter, thereby attenuating all frequencies above the fundamental frequency of the oscillator 15. The harmonics of this frequency are thus suppressed making it impossible for the circuit to pass the abrupt current changes caused when 16 is cut off and on by the input signal. There is thus produced at the plate of tube 16 a sinuous but unilateral voltage wave somewhat as shown by the wave form *d* of Fig. 3.

A voltage wave of this type, as will hereinafter be described, is exactly what is required to control and modulate a power oscillator of the type used herein.

In some cases it is desired to locate the modulator and power oscillator at a remote point with respect to the rest of the circuit. When this is true the output of the shaping tube 16 is coupled through an impedance converting cathode follower 17 and a transmission line, not shown, to the control grid of the modulator 18. The latter is preferably a tube with a high current rating such as an 807, having its cathode returned, for example, to a potential of 1000 volts below ground and its plate tied to ground through a plate load resistor 38 and an inductance 37. Such a connection permits the plate of the modulator to be held, for example in the quiescent condition, at −500 volts so that it may be direct coupled to the control grids of the oscillator tubes 19 and 20. Inductance 37 is selected to resonate at the oscillator 15 frequency with the distributed capacitance of the circuit. As a result of this resonance, the plate voltage of 18 will oscillate, for example, between zero and negative 1000 volts upon application to its grid of the aforementioned sinuously modulated signal obtained from the plate of tube 16.

For purposes of illustration, the power oscillator has been shown as a tuned plate type. The section of shorted transmission line 41, together with the output capacitance of the oscillator tubes 19 and 20, functions as the parallel resonant plate tank circuit. A second shorted transmission line 42, connected between the oscillator grids, provides feedback. To couple the power generated in the plate tank circuit to an antenna 45 a suitable coupling arrangement such as the magnetic pickup loop 44 may be provided.

In the quiescent condition the control grids of the oscillator tubes are, as aforementioned, held at about −500 volts and the oscillator will not operate. As the grids are driven toward zero at the start of the applied voltage wave to the modulator they reach a potential (around negative 300 volts) where oscillations start. The amplitude of the oscillations then increases as the grids of tubes 19 and 20 rise, reaching a maximum when the grids are near zero potential. Then, as the grids are again driven toward negative 1000 volts, the amplitude of the oscillations decreases until finally a voltage is reached (about negative 800 volts) at which oscillation stops completely. The oscillator then remains in a dormant condition until the grids of the tubes are again driven to the "start oscillation potential" (about negative 300 volts) at which time the build up and decay of oscillations is repeated. This action is represented by wave form *e* in Fig. 3 wherein, for purposes of simplification, only the sine wave modulation envelope is shown. At the conclusion of the sinuous driving voltage applied to the modulator 18, the grid voltage of the oscillator tubes returns to negative 500 volts where the oscillator is held quiescent.

Figure 2:
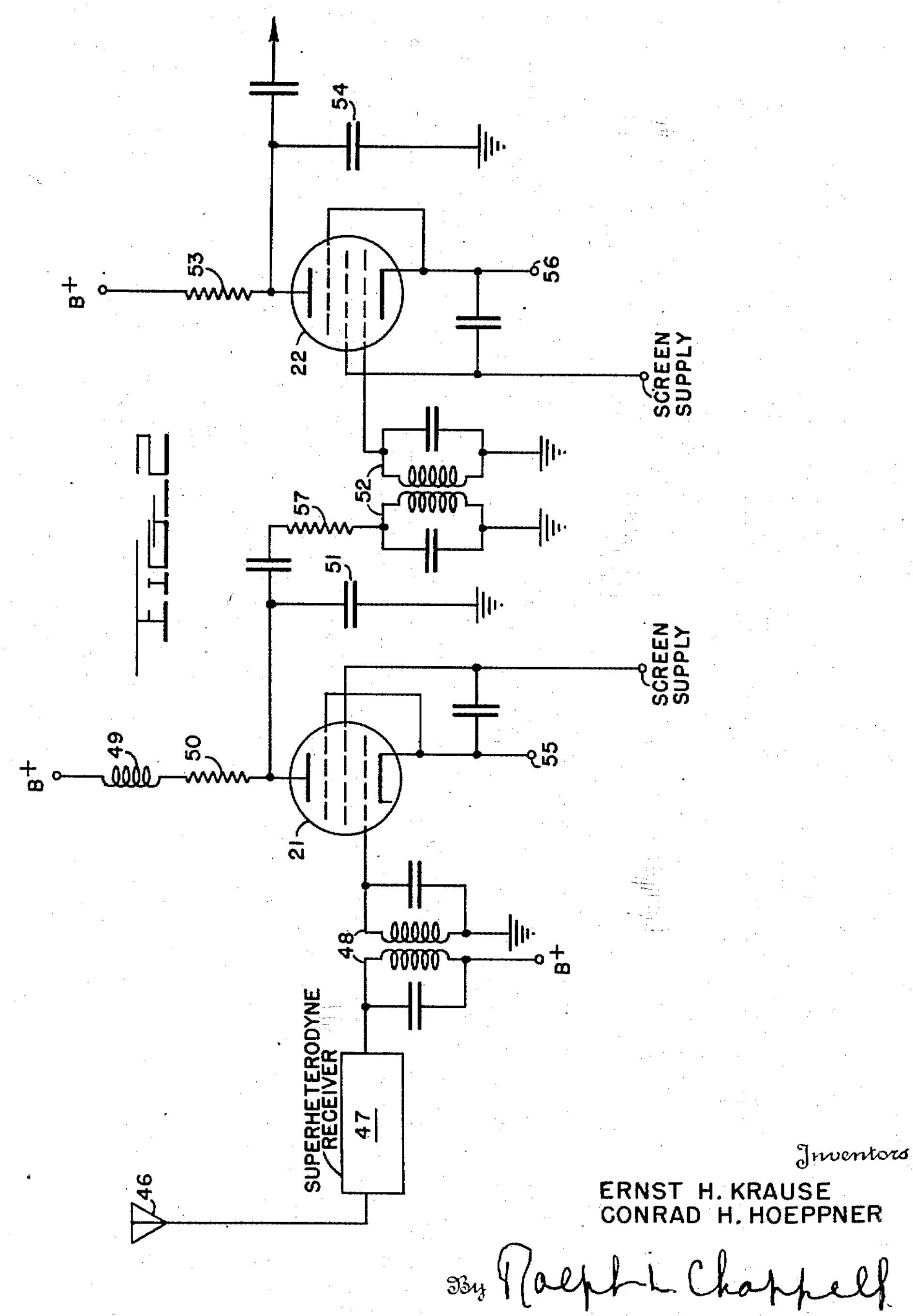
Fig. 2 is a schematic diagram of the receiver system of the invention.

From the foregoing it becomes obvious that in order to detect properly the intelligence of a pulse message obtained from the transmitter system shown in Fig. 1, a receiver having two detectors is required. Each of the detectors must have a distinct time constant, one being designed to demodulate the received radio frequency carrier, obtaining a sinuously modulated pulse, and the other to demodulate this sinuously modulated pulse to obtain an unmodulated pulse signal. A typical example of such a receiving system is shown in Fig. 2, comprising an antenna 46 of any suitable type, a superheterodyne receiver 47 which is conventional up to and including the final I. F. transformer 48, a first detector 21 for recovering the sine wave modulation and a second detector 22 for recovering the pulse signal. The I. F. output of the receiver is a modulated pulse signal such as that shown by wave form *f* of Fig. 4. This signal is coupled through the final I. F. transformer 48 to the control grid of the first detector 21.

The latter is operated at cut-off by the positive cathode potential 55 and in addition contains a plate load resistance 50 and a shunt capacitor 51 which forms a circuit having a long time constant compared to the half period of the I. F. signal. The cathode bias 55 permits tube 21 to conduct only on the positive half cycles of the input signal, while the capacitor 51 and resistor 50 function as a means for producing at the plate of tube 21 the sine wave modulation. Since tube 21 is biased to cut-off, however, the modulation would appear as a series of negative half-cycles. Therefore to completely recover the modulation envelope these negative half-cycles of voltage waves must be shaped. For this reason an inductance 49 is connected in the plate circuit of the detector and is selected to resonate at the modulation frequency with the distributed capacitance of the circuit and the capacitance 51. There will now appear across the capacitance 51, a voltage wave form such as that shown at *g* in Fig. 4. This voltage wave is coupled to the control grid of the second detector 22 through a high "Q" transformer 52. The latter is selectively tuned to the frequency of the sine wave generator 15 in the transmitter and converts the unilateral voltage wave input into the sine wave output represented by wave form *h* of Fig. 4. To obtain the full advantage of the shaping effect produced by both the transformer 52 and the resonant circuit including inductance 49 and capacitance 51 the two circuits should be isolated. For this purpose a large isolating resistance 57 in the order of 100,000 ohms is inserted in series with the transformer primary. A secondary effect resulting from this resistance is that it improves the impedance match between the output of the tube 21 and the transformer 52.

Detector 22, like detector 21, is biased to cut-off by a positive cathode voltage 56 and contains a time constant circuit consisting of plate load resistor 53 and shunt capacitor 54 which is long compared to the half cycle period of the sine wave modulation. The cathode bias 56 permits tube 22 to conduct only on the positive half cycles of the input signals, while the capacitor 54 and plate resistor 53 function as an integrator to produce at the plate of the tube the smooth negative voltage pulse shown by wave form *i* of Fig. 4. This pulse corresponds in time duration to that generated by the pulse generator at the transmitter.

Selective transmission is possible by variations in the character of the transmitted signal. For example, variations in the frequency of the carrier or the modulation frequency either singly or in combination provides flexibility to the system.

Figures 3, 4:
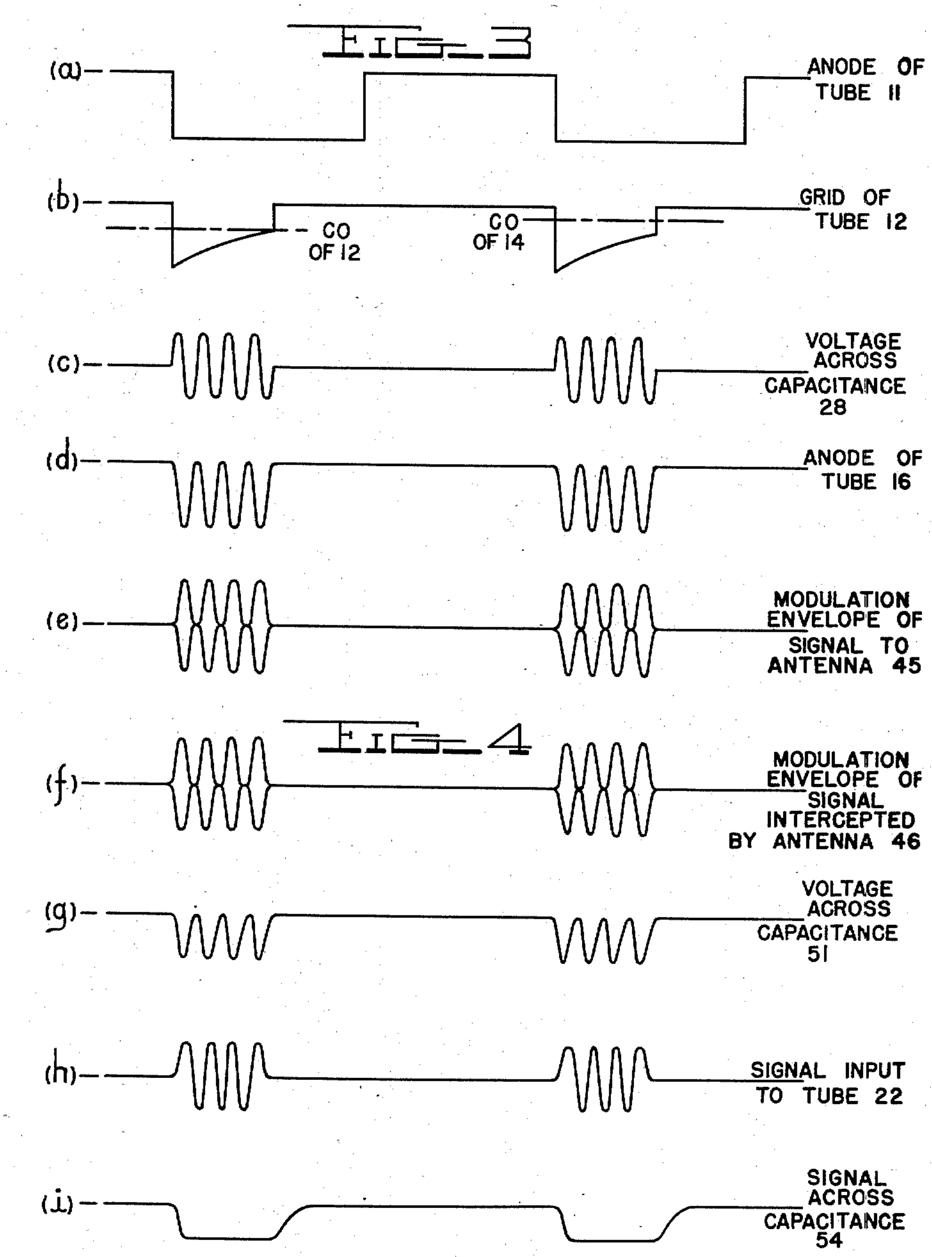
Figs. 3 and 4 show a series of wave forms which are taken to illustrate the operation of the circuits shown in Figs. 1 and 2 respectively.

In regard to Figs. 3 and 4 it should be noted that for purposes of illustration the wave forms shown therein are drawn in a greatly simplified manner. For example, under the operating conditions hereinbefore selected the number of cycles of modulation on each of the transmitted pulses would be 100 rather than 4 as illustrated by wave forms *e* and *f* of Fig. 4. Also high "Q" transformers such as transformer 52 will produce a gradual build up of oscillations rather than the rapid changes illustrated by wave form *h* in Fig. 4.

Although we have shown and described the present invention as a repetitive system in which certain of the elements, such as the sine wave generator 15, modulator 18 and power oscillator 19 and 20 were of the preferred type it must be understood that various changes therein can be made without exceeding the spirit of the invention. Therefore this invention is not to be limited except insofar as is necessitated by the spirit of the prior art and the scope of the description.

The invention described herein may be manufactured and used by or for the Government of the United States of America for government purposes without payment of any royalty thereon or therefor.

What is claimed is:

1. A radio pulse type communication system, comprising a sine wave voltage generator, means responsive to each pulse signal to be transmitted for controlling the operation of said sine wave voltage generator, means for converting the output of said sine wave voltage generator into a unilateral and sinuous voltage wave, a transmitter, means operating said transmitter in response to said sinuous voltage wave so as to produce a sinuously amplitude modulated pulse of electromagnetic energy therefrom, a receiving means having a first circuit tuned to receive the transmitted pulses, a first detector following said first circuit for selecting the amplitude modulation from the received signal, a second circuit tuned to the modulation frequency, a second detector connected to said first detector through said second tuned circuit for converting said modulation into a pulse signal which corresponds in time duration to that produced at the transmitter.

2. In a radio pulse type communication system, a transmitter of sinuously amplitude modulated pulses of electromagnetic energy comprising a source of pulse signals, a sine wave generator, a keying circuit connected between said pulse source and said sine wave generator for producing a sinuous wave for the duration of each pulse signal, a shaping circuit including a low pass filter connected to the sine wave generator for converting its output to a unilateral sinuous wave, a power oscillator of much greater frequency than said sine wave generator and a radiating means therefor, and modulating means connected between said shaping circuit and said power oscillator.

ERNST H. KRAUSE.
CONRAD H. HOEPPNER.

REFERENCES CITED

The following references are of record in the file of this patent:

UNITED STATES PATENTS

| Number | Name | Date |
|---|---|---|
| 1,349,729 | Nelson | Aug. 17, 1920 |
| 1,415,992 | Clement | May 16, 1922 |
| 1,642,663 | Chaffee | Sept. 13, 1927 |
| 1,707,271 | Little et al. | Apr. 2, 1929 |
| 2,266,401 | Reeves | Dec. 16, 1941 |
| 2,298,409 | Peterson | Oct. 13, 1942 |
| 2,392,114 | Bartelink | Jan. 1, 1946 |
| 2,392,546 | Peterson | Jan. 8, 1946 |
| 2,402,916 | Schroeder | June 25, 1946 |
| 2,419,292 | Shepard | Apr. 22, 1947 |
| 2,445,618 | Hutcheson | July 20, 1948 |
| 2,450,443 | Rich | Oct. 5, 1948 |